US008670620B2

(12) United States Patent
Robles-Kelly et al.

(10) Patent No.: US 8,670,620 B2
(45) Date of Patent: Mar. 11, 2014

(54) DECOMPOSING HYPERSPECTRAL OR MULTISPECTRAL IMAGE DATA

(75) Inventors: Antonio Robles-Kelly, Kaleen (AU); Cong Phuoc Huynh, Braddon (AU)

(73) Assignee: National ICT Australia Limited (AU)

( * ) Notice: Subject to any disclaimer, the term of this patent is extended or adjusted under 35 U.S.C. 154(b) by 274 days.

(21) Appl. No.: 13/207,016

(22) Filed: Aug. 10, 2011

(65) Prior Publication Data

US 2013/0039580 A1    Feb. 14, 2013

(51) Int. Cl.
*G06K 9/46* (2006.01)
(52) U.S. Cl.
USPC .......................................................... 382/191
(58) Field of Classification Search
USPC ................................ 382/159, 173, 191, 225, 305
See application file for complete search history.

(56) References Cited

U.S. PATENT DOCUMENTS

| 6,804,400 | B1 * | 10/2004 | Sharp | ............................. | 382/239 |
| 7,035,457 | B2 * | 4/2006 | Ishibashi | ........................ | 382/166 |
| 7,630,990 | B2 | 12/2009 | Hirata | | |

OTHER PUBLICATIONS

Kenneth Rose, "Deterministic Annealing for Clustering, Compression, Classification, Regression, and Related Optimization Problems", Proceedings of the IEEE, vol. 86, No. 11, Nov. 1998, pp. 2210-2239.
Graham D. Finlayson et al., "Convex and Non-convex Illuminant Constraints for Dichromatic Colour Constancy", 2001, 7 pages.
Cong Phuoc Huynh et al., "A Probabilistic Approach to Spectral Unmixing", Aug. 11, 2010, 10 pages.
Randall B. Smith, Ph.D., "Analyzing Hyperspectral Images", MicroImages, Inc., May 11, 2011, 40 pages.
Randall B. Smith, Ph.D., "Hyperspectral Imaging", MicroImages, Inc., Jul. 14, 2006, 24 pages.
Steven A. Shafer, "Using Color to Separate Reflection Components", Computer Science Department, University of Rochester, Apr. 1984, 29 pages.

* cited by examiner

*Primary Examiner* — Daniel Mariam
(74) *Attorney, Agent, or Firm* — Snell & Wilmer L.L.P.

(57) ABSTRACT

The disclosure concerns processing of electronic images, such as hyperspectral or multispectral images. In particular, but is not limited to methods, software and computer systems for determining underlying spectra of an image of a scene. The image data comprises for each pixel location a sampled image spectrum that is a mixture of plural reflectance spectra. Processor 310 determines or accesses plural hyperplanes that each have plural linearly independent basis vectors. Each hyperplane represents an estimate of one of the plural reflectance spectra. The processor 310 then determines for each pixel location, a contribution of the plural basis vectors of each hyperplane to the image spectrum of that pixel location. The processor 310 determines or accesses plural hyperplanes and not plural endmembers directly. Hyperplanes are two-dimensional while endmembers are only one-dimensional. As a result, hyperplanes carry more information, such as the illumination spectrum and are therefore of greater use. The decomposition of the image data into hyperplanes is possible without knowing the illumination spectrum. This decomposition allows for a range of new applications such as endmember extraction and compact representation.

23 Claims, 6 Drawing Sheets

DECOMPOSING HYPERSPECTRAL OR MULTISPECTRAL IMAGE DATA

TECHNICAL FIELD

The disclosure concerns processing of electronic images, such as hyperspectral or multispectral images. In particular the invention concerns, but is not limited to, methods, software and computer systems for determining underlying spectra of materials in a scene captured in the image.

BACKGROUND ART

Aerial surveillance is commonly used for investigating the surface of the earth. In particular, images taken by satellites are used to identify objects or materials on the ground.

FIG. 1 illustrates a surveillance system 100 comprising an illumination source 101, such as the sun and a satellite 102 with a camera 104. The camera captures images of the surface of the earth 106. Located on the surface of the earth 106 are in this example a street 108 and plants 110. The street 108 and the plants 110 differ in the way they reflect the light which is the reason why they appear as having different colours to the eye. The measure of reflection of light from different materials is referred to as reflectance. Throughout this specification, the quantitative measure of the reflectance at different wavelengths, that is the spectrum of the reflectance, is referred to as reflectance spectrum. The reflectance spectrum is a material property and therefore invariant to the illumination spectrum. In most cases, the illumination spectrum is not ideal white light and therefore, the received light spectrum is a combination of the illumination spectrum and the reflectance spectrum of the material. The received light spectrum is referred to as radiance.

The camera 104 of satellite 102 is a digital camera with a number of pixels. Each pixel captures a part of the image of the surface of the earth 106. The figure shows an exemplary pixel area 110, which is the area in the scene that is covered by one exemplary pixel. In this example, the pixel area 110 covers only the black street surface. As a result the pixel colour value is black.

Multispectral cameras, deliver not only a colour value or values for three primary colours but many values. These values represent the spectrum of the light reflected from the surface of the earth 106 and are referred to as radiance spectrum. The capture of radiance spectrum is useful since different materials have different characteristic reflectance spectra and therefore, the material can be determined from the captured radiance spectra. In this example, from the radiance spectrum of pixel area 110 it is determined that the material in this area is asphalt concrete.

Due to the limited spatial resolution of camera 104 and the small size of objects on the surface of the earth 106, the pixel area 110 may cover more than one material at one time. As a result, the radiance spectrum at that pixel location is a mixture of the reflectance spectra of the different materials within the pixel area 110. In other words, there are underlying spectra in the radiance spectrum of each pixel that originate from the different materials. The determination of this sub-pixel information, that is the determination of the underlying spectra, such as the material reflectance spectra, is referred to as spectral unmixing.

The illumination spectrum is an additional component to the mixture of the material spectra. It is difficult to find any underlying spectra in the radiance spectra and these underlying spectra are not the material reflectance spectra unless the illumination spectrum is also considered.

FIG. 2 illustrates a transformation 200 of first and second material reflectance spectra 210 and 220 respectively, into a sample space 230. In this simplified example, the illumination spectrum is constant for all wavelengths and the surface of the observed object is an even plane. The first material reflectance spectrum 210 is sampled at two wavelengths $\lambda_1$ and $\lambda_2$. This results in reflectance values 211 and 212. The reflectance values 211 and 212 of the first material reflectance are represented by a first endmember 231 in the two-dimensional sample space 230.

Similarly, the second material reflectance spectrum 220 is sampled at the same two wavelengths $\lambda_1$ and $\lambda_2$ resulting in reflectance values 221 and 222, which are represented by a second endmember 232 in the sample space 230. In this way, many different material reflectance spectra can be represented in the same sample space. In this example, the sample space comprises a third endmember 233 representing a third material reflectance spectrum (not shown).

It is noted that in most applications the material reflectance spectra are sampled at far more points, such as one hundred. In fact, the sample wavelengths may be the same as the wavelengths of the hyperspectral image data. As a result, the sample space 230 is high-dimensional—one dimension for each wavelength.

The three endmembers 231, 232 and 233 form triangle 235. Under ideal white light the mixture of material reflectance spectra lies within the triangle 235.

In most applications, the material reflectance spectra are unknown and need to be determined. If a sufficiently large number of different mixtures of these three material reflectance spectra is captured, the resulting points fill the triangle 235 and the corners could be identified as the underlying endmembers. However, more than two wavelengths need to be sampled to identify different materials. In the resulting multi-dimensional sample space, the determination of the underlying endmembers is difficult.

One problem with existing approaches is that the underlying spectra, such as endmember spectra, need to be provided to the method as an input. If the underlying spectra are not known, these methods cannot be used.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

In a first aspect there is provided a computer implemented method for decomposing hyperspectral or multispectral image data, the image data comprising for each pixel location a sampled image spectrum that is a mixture of plural reflectance spectra, the method comprising:

determining or accessing plural hyperplanes, each hyperplane having plural linearly independent basis vectors, wherein each hyperplane represents an estimate of one of the plural reflectance spectra; and determining for each pixel location, a contribution of the plural basis vectors of each hyperplane to the image spectrum of that pixel location.

It is an advantage that the method determines or accesses plural hyperplanes and not plural endmembers. Hyperplanes are spanned by two basis vectors. As a result, hyperplanes carry more information, such as the illumination spectrum and are therefore of greater use. The decomposition of the image data into hyperplanes is possible without knowing the illumination spectrum.

It is an even further advantage that the image is decomposed into plural hyperplanes and contributions. This decomposition allows for a range of new applications such as endmember extraction and compact representation.

The step of determining the contribution may comprise determining an association probability that optimises a first cost function based on affinities of the image spectrum to the set of hyperplanes.

The method may comprise the step of determining an optimised set of hyperplanes that optimises a second cost function based on the association probabilities.

Determining or accessing the set of hyperplanes may comprise retrieving hyperplanes or linearly independent basis vectors stored on a spectral library or determining the set of hyperplanes or linearly independent basis vectors based on clustering or randomly.

The method may be repeated and the step of accessing plural hyperplanes may comprise retrieving the optimised set of hyperplanes from the preceding repetition.

The method may be repeated until a difference between the accessed set of hyperplanes and the optimised set of hyperplanes is less than a predefined threshold.

The method may be repeated until a maximum number of iterations is reached.

The first cost function may be based on a measure of entropy. It is an advantage that the optimisation of the cost function also optimises the entropy of the association probabilities. As a result, the association probabilities are biased towards a greater number of independent hyperplanes. This prevents the method from determining an association probability for only one hyperplane in cases where the image spectrum is a mixture of more than one independent hyperplanes. As a result of using the association probabilities with maximised entropy, the independence of the basis vectors of the hyperplanes is also maximised.

The measure of entropy may be weighted by a temperature.

The method may comprise the step of lowering the temperature of a previous repetition to a lower temperature for a following repetition.

The step of lowering the temperature may comprise lowering the temperature according to one of:
 a predetermined factor,
 an exponential decay,
 a fixed temperature step,
 an adaptive schedule, and
 a logarithmic function.

The method may comprise the step of determining whether a bifurcation occurs at or near the temperature.

The method may comprise the step of, upon determining that a bifurcation occurs, adding one or more additional hyperplanes to the set of hyperplanes or the optimised set of hyperplanes.

The method may be repeated until a predetermined termination condition is satisfied.

The predetermined termination condition may be based on one of:
 a minimum temperature, and
 a maximum number of hyperplanes.

The method may comprise the step of determining an intersection of the hyperplanes to determine an illumination spectrum.

The method may comprise the step of determining endmembers of materials present in the scene based on the image data, the illumination spectrum and the contributions.

The step of determining the intersection of the hyperplanes may comprise the steps of:
 determining or accessing plural illumination spectra;
 determining for each pixel location, a measure of contribution of each illumination spectrum.

The method may further comprise the step of storing on a computer readable medium a compact representation comprising the plural hyperplanes and for each pixel location the contribution of the basis vectors of each hyperplane for that pixel location. It is an advantage that the compact representation is stored on a computer readable medium to be available to a processor or other computer systems in a compact form that requires less storage space and less bandwidth.

The method may further comprise:
 determining one or more intersections of the hyperplanes;
 determining an illumination spectrum based on the one or more intersections; and
 determining for each hyperplane and based on the illumination spectrum the reflectance spectrum of that hyperplane.

It is an advantage that the reflectance spectrum of each hyperplane is determined. As a result, the method determines which materials are present at each pixel location.

In yet another aspect there is provided software, that when installed on a computer causes the computer to perform the method for decomposing hyperspectral or multispectral image data as described above.

In another aspect there is provided a computer system for decomposing hyperspectral or multispectral image data, the image data comprising for each pixel location a sampled image spectrum that is a mixture of plural reflectance spectra, the system comprising:
 a processor to determine or to access plural hyperplanes, each hyperplane having plural linearly independent basis vectors, wherein each hyperplane represents an estimate of one of the plural reflectance spectra; and to determine for each pixel location, a contribution of the plural basis vectors of each hyperplane to the image spectrum of that pixel location.

The computer system may comprise a port to receive the set of hyperplanes and/or image data.

The computer system may comprise a storage to store the hyperplanes where they are accessed by the processor, and to store the plural hyperplanes and for each pixel location the contribution of the basis vectors of each hyperplane for that pixel location.

The storage is typically a machine-readable medium that includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; dedicated optical, acoustical or other form of non-transitory storage devices.

In yet another aspect there is provided a computer implemented method for determining reflectance spectra from a compact representation of image data, the method comprising:

receiving or accessing the compact representation comprising plural hyperplanes each of which having plural linearly independent basis vectors and for each pixel location a measure of contribution of the basis vectors of each hyperplane;

determining one or more intersections of the hyperplanes;

determining an illumination spectrum based on the one or more intersections; and determining for each hyperplane and based on the illumination spectrum a reflectance spectrum represented by that hyperplane.

The method for determining reflectance spectra from a compact representation of image data may further comprise determining a compact representation comprising decomposing hyperspectral or multispectral image data according to the method for decomposing hyperspectral or multispectral image data as described above and storing the compact representation on a computer readable medium.

In yet another aspect there is provided a computer system for determining reflectance spectra from a compact representation of image data, the computer system comprising:

a processor to receive or access the compact representation comprising plural hyperplanes that each have plural linearly independent basis vectors and for each pixel location a measure of contribution of the basis vectors of each hyperplane; to determine one or more intersections of the hyperplanes; to determine an illumination spectrum based on the one or more intersections; and to determine for each hyperplane and based on the illumination spectrum a reflectance spectrum of that hyperplane.

In yet another aspect there is provided software, that when installed on a computer causes the computer to perform the method for determining reflectance spectra from a compact representation of image data.

Optional features described of any aspect, where appropriate, similarly apply to the other aspects also described here.

BEST MODE FOR CARRYING OUT THE INVENTION

Figure 3:
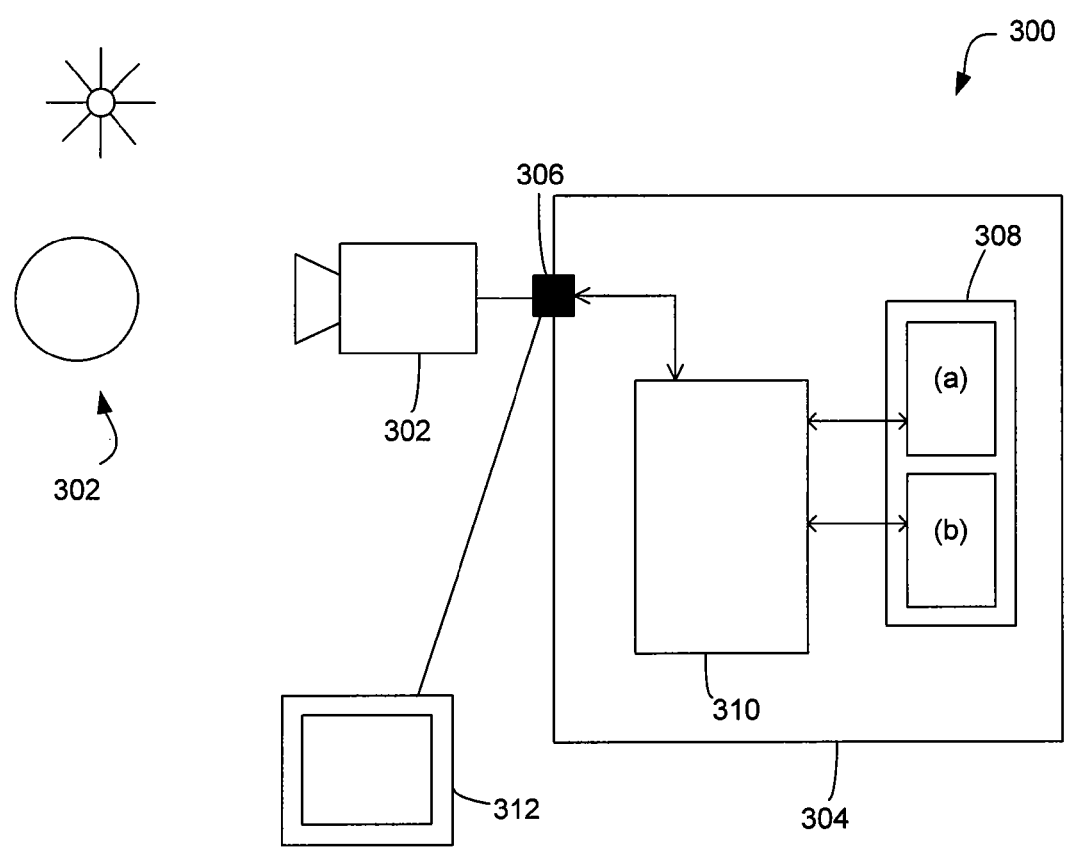

FIG. 3 illustrates a computer system 300 for determining basis spectra, that is underlying independent spectra, of wavelength indexed image data and decomposing the image data into the underlying spectra. Computer system 300 comprises a sensor 302 and a computer 304. In this example the sensor 302 is a hyperspectral or multispectral sensor that is able to capture an image of a scene 305, in this case the earth illuminated by the sun.

In one example, the computer system is integrated into a satellite orbiting the sun. In other examples the computer system is integrated into a handheld device such as a consumer camera and the scene 302 may be any scene on the earth, such as a tourist attraction or a person. The scene may also be illuminated by multiple artificial light sources, such as fluorescent lamps. The sensor 302 may have a number of bands that balances computational costs with accuracy. The sensor 302 may have as low as four bands and as high as hundreds.

The computer 304 receives images from the sensor 302, which are stored in local memory 308(b) by the processor 310. The processor 310 uses software stored in memory 308 (a) to perform the method shown in FIG. 4. In this sense the processor 310 performs the method of decomposing image data to determine plural hyperplanes and corresponding contributions, such as association probabilities. Each hyperplane has two linearly independent basis vectors spanning that hyperplane. The processor decomposes the images into a combination of the basis vectors weighted by the association probabilities to form a compact representation of the image.

In another example, the processor accesses the hyperplanes from a materials library stored on memory 308(b). Accessing the hyperplanes also comprises accessing the basis vectors that span the hyperplanes or accessing endmember spectra that are represented by the hyperplanes. It is noted, however, that the materials library is not necessary. If no materials library is available, the proposed method determines the basis vectors as described further below.

The processor stores the compact representation instead of or in addition to the originally stored image data in memory 308(b). Based on the basis spectra, the processor also performs the method of intersecting dichromatic hyperplanes to determine the illumination spectrum and the endmember spectra present in scene 302. For storing the basis or other spectra the computer may employ the method described in WO 2009/152583 "Compact Representation of a Reflectance Spectrum" which is incorporated herein by reference.

The software provides a user interface that can be presented to the user on a monitor 312. The user interface is able to accept input from the user (i.e. touch screen), such as information about known materials in the scene although this is not necessary for the proposed method. The monitor 312 displays to the user the material information recovered by the processor performing the method. In one example, the material information is displayed as plural material abundances.

The user input is provided to the input/out port 306 by the monitor 312. The image is stored in memory 308(b) by the processor 310. In this example the memory 308(b) is local to the computer 302, but alternatively could be remote to the computer 302.

Figure 4:
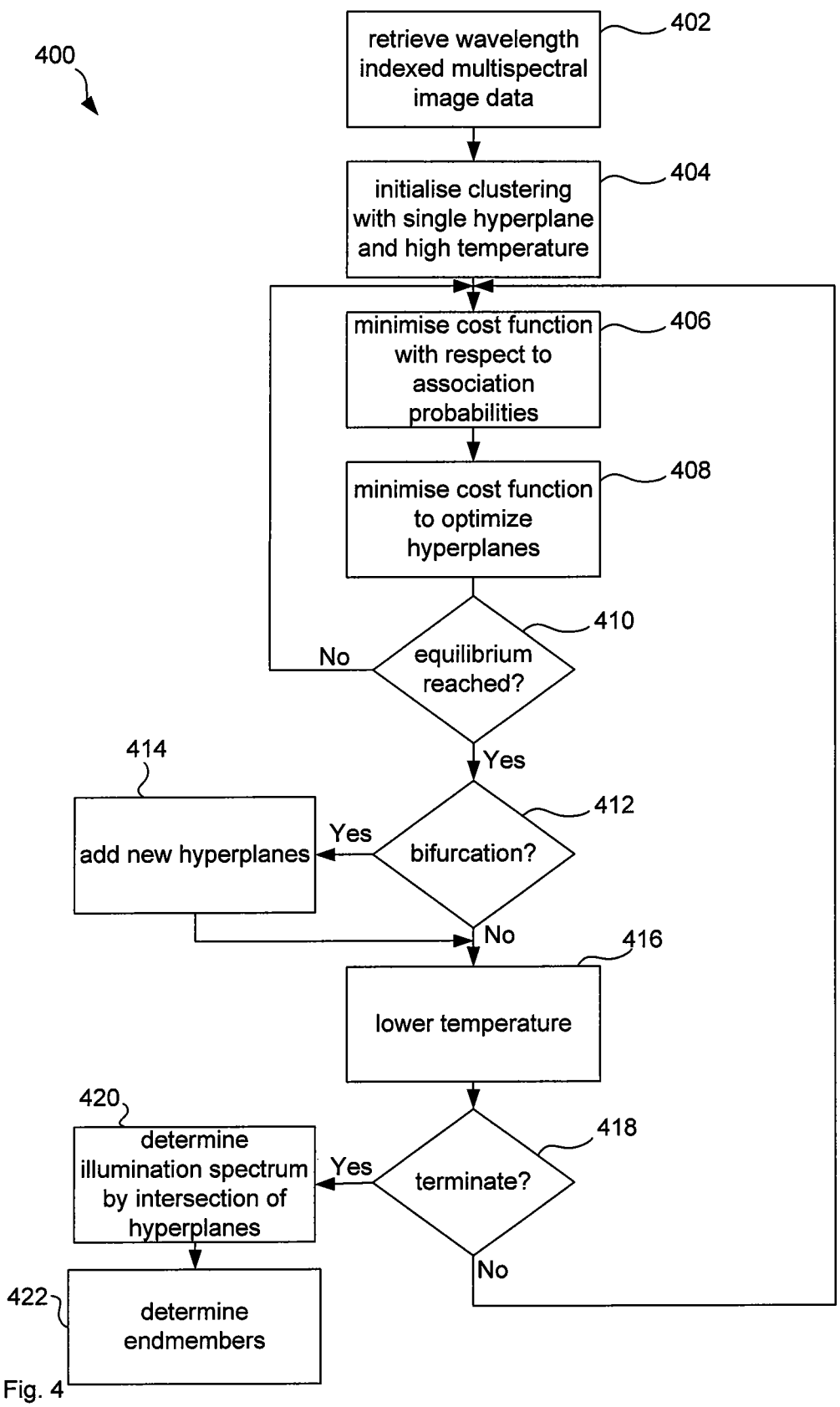
FIG. 4 illustrates a method for determining basis spectra of materials for pixel of wavelength indexed image data.

FIG. 4 illustrates a method 400 for decomposing hyperspectral or multispectral image data by determining underlying basis spectra, such as material reflectance spectra, for pixel of wavelength indexed image data. The first step is to retrieve 402 wavelength indexed hyperspectral or multispectral image data of a scene. In this example, the image data is retrieved from the memory 308(b). In other examples, the image data is received directly from the sensor 302. The image data is represented by pixel location that can be one or more individual pixels and for each pixel the data contains a number of radiance values, one radiance value for each wavelength of the light spectrum. In one example, the light spectrum covers the visible spectrum (430-720 nm). In another example, the light spectrum also covers wavelengths that are not visible to the human eye, such as infrared light (650-990 nm). The different wavelengths may be equally spaced, such as by 10 nm, or may be closer to each other over parts of the spectrum that are more significant for the discrimination of different materials. For instance, the spectrum of Chlorophyll has a distinctive peak in the green light spectrum.

Figure 1:
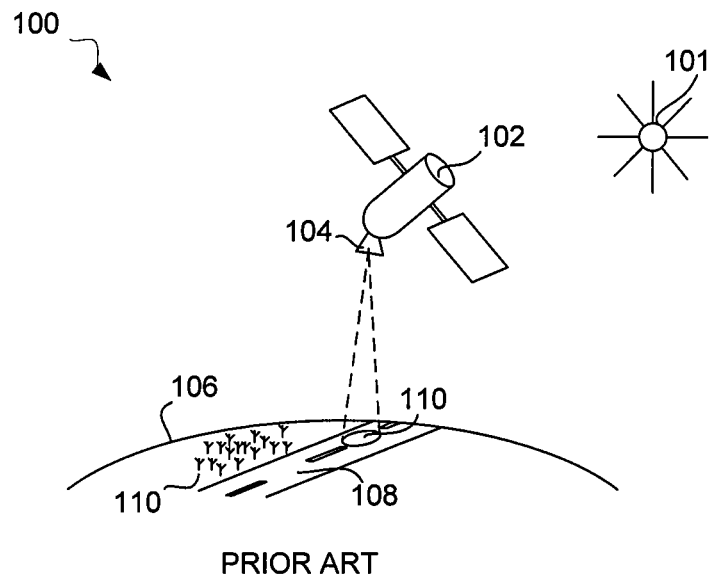
FIG. 1 illustrates a surveillance system (prior art).
Figure 2:
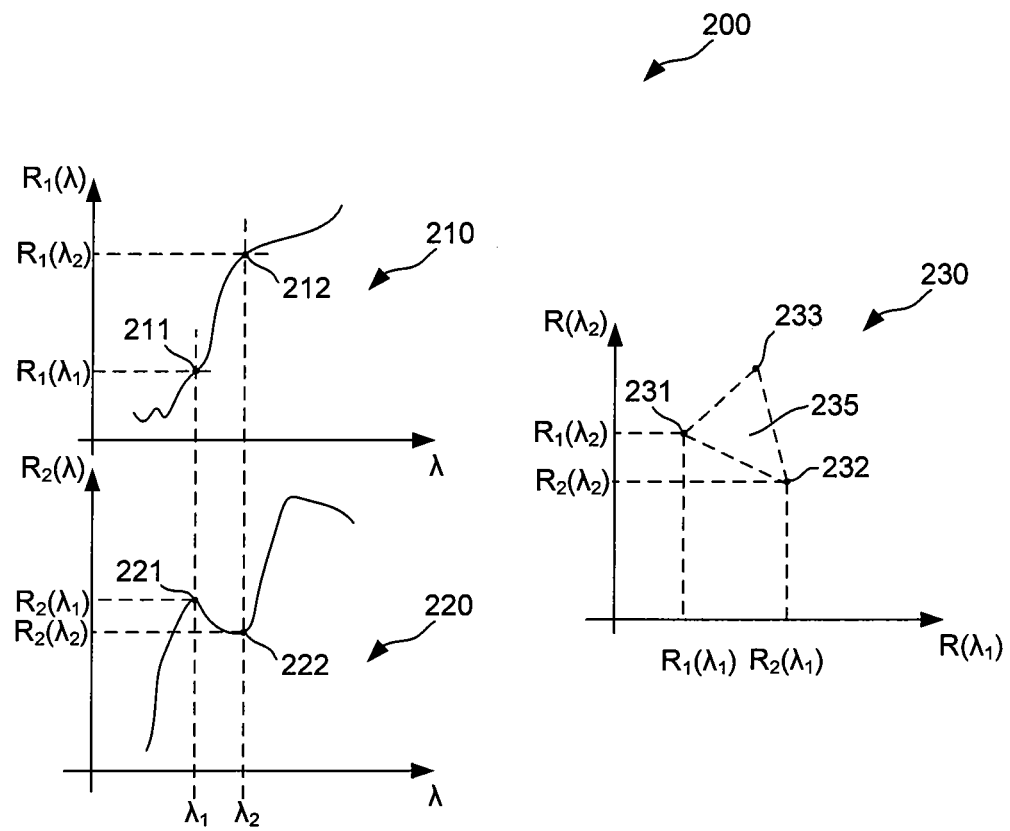
FIG. 2 illustrates a transformation of first and second material reflectance spectra and into a sample space (prior art). An example will be described with reference to FIG. 3 illustrates a computer system for determining basis spectra of wavelength indexed image data.
Figure 5:
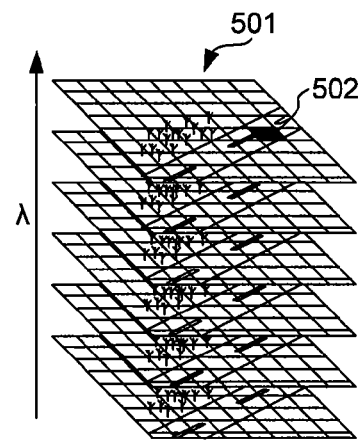
FIG. 5 illustrates a data structure for the multispectral image data.

FIG. 5 illustrates a data structure 501 for the multispectral image data. The data structure comprises layers, one for each wavelength. Each layer represents the radiance values for one wavelength. One pixel 502 is highlighted and relates to pixel area 110 in FIG. 1. The values of pixel 502 for different wavelengths, that is the radiance values from lower layers at the same location as pixel 502, represent a radiance spectrum also referred to as the image spectrum. This image spectrum is a mixture of the illumination spectrum and the reflectance spectra of the different materials present in the part of the scene that is covered by pixel 502.

Method 400 optimises an initial set of dichromatic hyperplanes using a deterministic annealing algorithm. The crucial parameter of the deterministic annealing is referred to as temperature. During the annealing process of materials, the temperature is lowered gradually and the material changes, such as by forming crystals, at certain temperatures. In the case of method 400, instead of forming crystals, new hyperplanes are formed at certain temperatures.

Figure 6A:
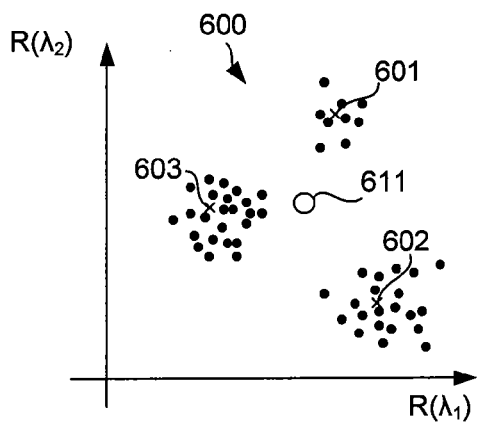
FIGS. 6a, 6b and 6c illustrate a general deterministic annealing algorithm used for clustering samples.
Figure 6B:
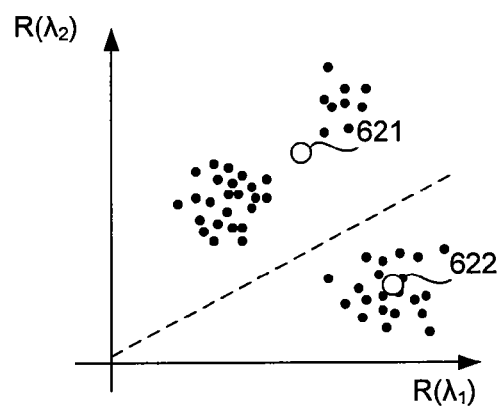
Figure 6C:
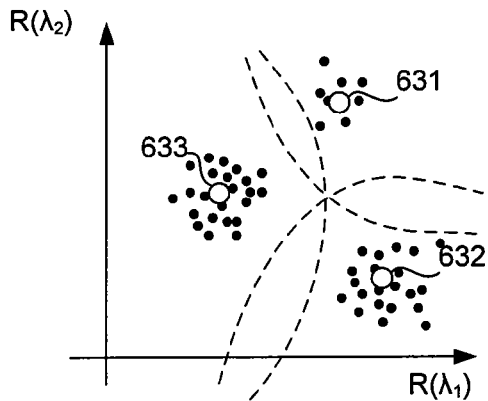

FIGS. 6a to 6c illustrate a general deterministic annealing algorithm used for clustering samples 600 represented by solid dots that are clustered around three centre points 601, 602 and 603. The algorithm aims to find the three centre points 601, 602 and 603. A detailed description of the algorithm is given in [1] which is incorporated herein by reference. The algorithm will now be described generally with reference to this abstract example because the use of multi-dimensional hyperplanes is difficult to illustrate clearly. The detailed application of the algorithm to the problem of image decomposition will then be described in more detail later.

The algorithm starts with a high temperature and an initial estimate 611, such as the centre of gravity of all the samples. By optimising a cost function, the algorithm then finds an optimal contributions such as association probability for each sample, that is the probability that one sample belongs to the initial estimate 611. This step seems trivial since in case of only one estimate 611, the association probability for each sample is one. Given the association probability, the initial estimate 611 is optimised based on the same cost function.

Then, the temperature is lowered and a second estimate is created resulting in two estimates 621 and 622 as shown in FIG. 6b. Now, the optimisation of association probabilities is not trivial anymore and results in an optimal association probability for each sample and each estimate. Given the optimal association probabilities, the estimates 621 and 622 are optimised. Given the optimised estimates 621 and 622, the association probabilities need to be optimised again. This iteration continues until the results settle, that is the results do not change between the optimisation steps.

At this point the temperature is lowered again which results in three estimates 631, 632 and 633 as shown in FIG. 6c. The above iterative optimisation procedure is repeated for the three estimates 631, 632 and 633. More steps of lowering the temperature and optimising the association probabilities and estimates follow until a minimal temperature or a maximal number of estimates is reached.

In terms of image data the three centre points 601, 602 and 603 in FIG. 6a do not directly represent the material endmembers since the illumination spectrum influences the coordinates of the centre points 601, 602 and 603. In this example each centre point is directly related to one optimal dichromatic hyperplane. The dichromatic hyperplanes associated to the centre points 601, 602 and 603 are used to eliminate the influence of the illumination spectrum in a later step of the method 400.

Referring back to FIG. 4, after retrieving 402 the image data, the next step of method 400 is to initialize 404 the deterministic annealing algorithm with one hyperplane and a high temperature, such as 0.02. In one example, this hyperplane is randomly placed in the sample space. In different examples, the hyperplane is the result of a clustering algorithm. In yet another different example, the deterministic annealing algorithm is initialized with plural hyperplanes accessed from a library of known material spectra.

Each hyperplane is defined by two linearly independent basis vectors: $A(M)=[z_1(M),z_2(M)]$.

Figure 7:
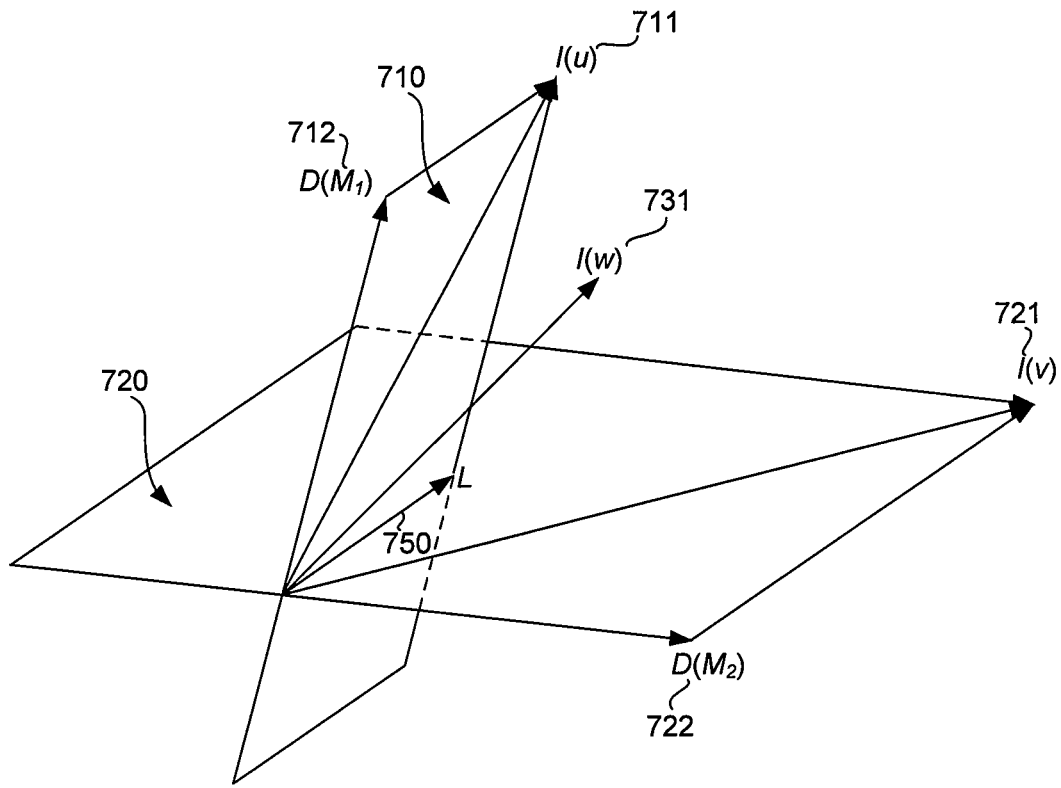
FIG. 7 illustrates two intersecting dichromatic hyperplanes.

FIG. 7 illustrates two intersecting dichromatic hyperplanes 710 and 720 and illumination spectrum 750. The notation of dichromatic hyperplanes is related to the dichromatic reflection model [2]:

$$I(u,\lambda)=g(u)L(\lambda)S(u,\lambda)+k(u)L(\lambda) \quad (1)$$

where $I(u, \lambda)$ is the radiance spectrum for wavelength $\lambda$ at pixel location u, g is the surface geometry, $L(\lambda)$ is the illumination spectrum, $S(u, \lambda)$ is the reflectance spectrum of the material, that is the endmember, and k(u) is the specular coefficient. According to equation (1), the captured radiance can be represented by a linear combination of $L(\lambda)$ times $S(u, \lambda)$ weighted by the surface geometry g(u) and $L(\lambda)$ weighted by the specular coefficient k(u). The element-wise product $D=L(\lambda) S(u, \lambda)$ is referred to as the diffuse colour of the material. Each of the two components of the linear combination are represented by a vector and the radiance then lies in a plane spanned by the vectors D and L. This shows clearly how hyperplanes are better suited for representing image data than reflectance spectra since hyperplanes also include information about the illumination spectrum.

FIG. 7 further illustrates three image spectra 711, 721 and 731 of three pixels u, v and w respectively. Image spectrum 711 of pixel u lies in plane 710 that is spanned by the diffuse colour 712 of material $M_1$ and the illumination spectrum L 750. Therefore, pixel u represents material $M_1$ in a pure form, that is not mixed with any other material. Similarly, image spectrum 721 of pixel v lies in plane 720 that is spanned by the diffuse colour 722 of material $M_2$ and the illumination spectrum L 750. Therefore, pixel v also represents material $M_2$ in a pure form. Image spectrum 731 of pixel w does not lie in any of the planes 710 or 720 and therefore represents a mixture of the two materials $M_1$ and $M_2$.

When an image is captured only the image spectra 711, 721 and 731 are available. Neither the spectra 712 and 722 of the diffuse colour of the materials nor the illumination spectrum 750 are known. It is therefore not possible at this stage to determine which image spectra are pure and which are mixtures of the reflectance spectra. Therefore, the dichromatic hyperplanes 710 and 720 are determined by the deterministic annealing algorithm and the illumination spectrum is then determined by finding the intersection of the hyperplanes.

The next step of method 400 in FIG. 4 is to minimise 406 a cost function with respect to contributions, that is association probabilities.

Figure 8:
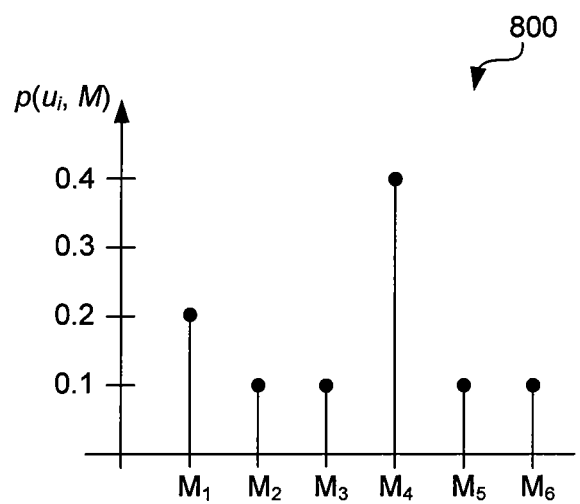
FIG. 8 illustrates a probability density function for one pixel u.

FIG. 8 illustrates a probability density function (pdf) 800 for one pixel u. The pdf 800 contains for each candidate material M an association probability p(u, M) that the current pixel contains candidate material M. For the sake of simplicity, in the following the candidate material M is referred to simply as material. The variable M is an index to reference the candidate from 1 to the number current materials, that is number of hyperplanes. Each material is represented by a dichromatic hyperplane and one pdf 800 is needed for each pixel. The pdf represents the contribution of each material to the image spectrum at that pixel location.

In most cases the pdf 800 is not symmetric or of any regular shape because the arrangement of the different materials on the horizontal axis is arbitrary. For illustration purposes the pdf 800 in FIG. 8 shows values for six different materials although after the initialization step only one hyperplane and therefore only one material is present. Directly after the initialization 404, the pdf 800 is degenerated to a single material with probability one. That is, each pixel consists of only one material.

A cost function of association probabilities p and affinities d(u,M) between the image spectrum and the reflectance spectrum of the material is formulated as $$C_{Total} = \sum_{u \in I} \sum_{M \in \mathcal{M}} p(M \mid u) d(u, M) \quad (2)$$

The affinity d(u,M) between the image spectrum and the reflectance spectrum of the material can easily be determined from the known hyperplane. This will be described in more detail later. Optimising the above cost function results in the association of one pixel with only one material with probability one, that is the most likely pure material is found for each pixel. However, if the image spectrum represents a mixture of several materials, the association probabilities should represent the contribution of each material to the mixture. Therefore, a measure of independence is introduced into the above cost function which represents the entropy H of the solution:

$$C_{Entropy} = C_{Total} - L \quad (3)$$

where $$L = TH(P) + \sum_{u \in I} \alpha(u) \left( \sum_{M \in \mathcal{M}} p(M \mid u) - 1 \right) \quad (4)$$

and $$H(P) = -\sum_{u \in I} \sum_{M \in \mathcal{M}} p(M \mid u) \log p(M \mid u). \quad (5)$$

Equation (4) is a sum of the entropy and the constraint that the sum of the association probabilities of all materials for each pixel is one. The two elements are weighted by the temperature T and the factor $\alpha$, respectively.

In the first iteration after the initialization, the temperature T is set to a high value, such as 0.02. As a result, the main objective of optimising cost function (3) is maximising the measure of independence, that is the entropy or randomness, in the solution. As a result, the independence of the image data along the solution is maximised. This procedure is similar to other techniques of source separation, such as independent component analysis, where components are found that are the most independent from each other. This makes sure that the resulting set of components optimally represents the original independent sources of the mixture. The measure of independence penalizes solutions that converge onto only one single material. Instead, the measure of independence pushes the solution towards incorporating a greater number of independent hyperplanes.

The minimum of the cost function is found by setting the partial derivative $$\frac{\partial C_{Entropy}}{\partial p(M \mid u)} = d(u, M) + T \log p(M \mid u) + T - \alpha(u)$$

to zero. The resulting association probability is $$p(M \mid u) = \exp\left(\frac{-d(u, M)}{T} + \frac{\alpha(u)}{T} - 1\right) \propto \exp\left(\frac{-d(u, M)}{T}\right) \forall M, u \quad (6)$$

Since $$\sum_{M \in \mathcal{M}} p(M \mid u) = 1,$$

it can be shown that the optimal material association probability distribution, that is the optimal contribution, for a fixed endmember set M is given by the Gibbs distribution:

$$p(M \mid u) = \frac{\exp\left(\frac{-d(u, M)}{T}\right)}{\sum_{M' \in \mathcal{M}} \exp\left(\frac{-d(u, M')}{T}\right)} \quad (7)$$

Although at this stage of method 400 the association probabilities and hyperplanes may not be optimal, the result is sufficient to decompose the image data. The image data is represented by the basis vectors $z_1$ and $z_2$ of the hyperplanes weighted by the association probabilities. It is noted that by incorporating the entropy H into Equation (3), the independence of the data along the hyperplanes is maximised. Maximization does not need to arrive at the theoretically achievable maximum, but maximising refers to any step that brings the solution closer to such a maximum. Independence along the hyperplanes means that the basis vectors of one hyperplane are not linearly dependent upon those of any other hyperplane.

With the measures of contribution, that is the association probabilities, and the hyperplanes, the reflectance spectra of the materials can be estimated. This step will be described later after the hyperplanes and association probabilities are optimised.

In a different example, the association probabilities and hyperplanes are optimised iteratively to find plural hyperplanes that are closer to the image data and association probabilities that further maximise the measure of independence. Such an optimised solution allows a more compact decomposition of the image data with a smaller error between the original image data and the image data represented by the basis vectors and association probabilities. The optimisation process will now be described.

Once the optimal association probabilities for a fixed affinity d are determined according to equation (7) above, the cost function (3) is minimised 408 again but this time with respect to base vectors of the hyperplanes. In order to directly generate the hyperplanes without first determining the affinity d, the affinity d is rewritten as the distance between the radiance vector I and the hyperplane. This distance is the difference between radiance vector I and the orthogonal projection of the radiance vector I onto the hyperplane:

$$d(u,M)=\|I(u)-Q(M)I((u)\|^2 \qquad (8)$$

where Q(M) is the linear projection matrix $Q(M)=A(M)(A(M)^T A(M))^{-1} A(M)^T$ and the hyperplane is defined by two basis vectors: $A(M)=[z_1(M),z_2(M)]$.

The problem of finding an optimal hyperplane is therefore reformulated as finding an optimal projection matrix Q(M) by minimising $$C_{Light} = \sum_{u \in I} \sum_{M \in M} p(M \mid u) \|I(u) - Q(M)I(u)\|^2 - L \qquad (9)$$

Figure 9:
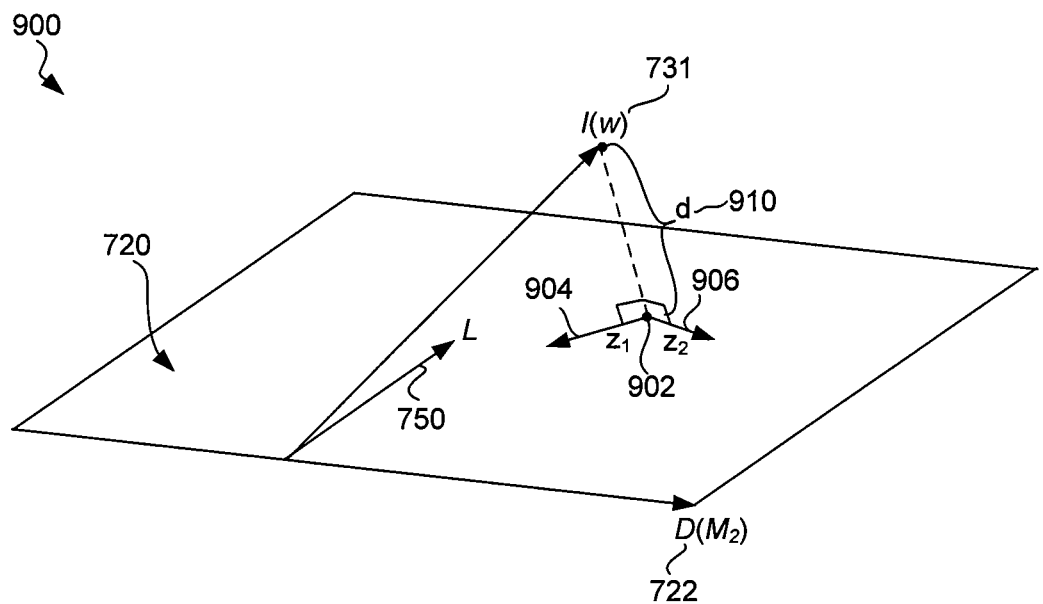
FIG. 9 illustrates a orthogonal projection onto a hyperplane.

FIG. 9 illustrates a sample space 900 comprising the hyperplane 720 from FIG. 7 that is spanned by the unknown diffuse colour vector D 722 of a material and the unknown vector of the illuminant spectrum L 750. The sample space 900 also comprises the radiance spectrum 731 of pixel w and an orthogonal projection 902 of radiance spectrum 731 onto the hyperplane 720. A first and a second basis vector $z_1$ 904 and $z_2$ 906 respectively are coplanar with the hyperplane 720. The first and second basis vectors 904 and 906 are linearly independent and as a result also define the hyperplane 720.

The minimisation of (9) with fixed association probabilities minimises a distance 910, which is equivalent to the affinity d. Since the affinity is expressed in terms of the basis vectors vector $z_1$ 904 and $z_2$ 906 according to (8), the minimisation results in the optimal basis vectors $z_1$ and $z_2$. The optimal hyperplane 902 is the plane spanned by the basis vectors vector $z_1$ 904 and $z_2$ 906.

The optimisation of (9) will now be formulated as an analytical expression. The outer sum of (9) can be rewritten as $$\sum_{u \in I} p(M \mid u) \|I(u) - Q(M)I(u)\|^2 = \qquad (10)$$

$$\sum_{u \in I} \left\| \sqrt{p(M \mid u)} I(u) - A(M)b(u, M) \right\|^2$$

with $A(M)=[z_1(M),z_2(M)]$ and
$b(u,M) \Box \sqrt{p(M|u)}(A(M)^T A(M))^{-1} A(M)^T I(u)$ The problem is to find a two-dimensional matrix $J=A(M) [b(u_1,M)b(u_2,M), \ldots, b(u_N,M)]$ for material M that is closest to a matrix I that comprises all pixel radiance spectra weighted by the respective association probabilities:

$$I=[\sqrt{p(M|u_1)}I(u_1),\sqrt{p(M|u_2)}I(u_2), \ldots, \sqrt{p(M|u_N)}I(u_N)] \qquad (11)$$

This problem is similar to the problem of Principle Component Analysis and therefore the solution is also similar. The optimal solution for matrix A is a matrix that comprises the two eigenvectors associated with the largest eigenvalues of matrix I. This way an optimal hyperplane is determined for each candidate material M.

After finding the optimal hyperplanes, it is determined 410 whether the optimised hyperplanes differ from the previous set of hyperplanes by more that a predefined threshold. If the hyperplanes differ by more that the predefined threshold, the method returns to the step 406 of minimising the cost function with respect to the association probabilities. The method is repeated such that the hyperplanes for determining the association probabilities are the hyperplanes from the preceding optimisation. Vice versa, the association probabilities for determining the basis vectors of the hyperplanes are the association probabilities from the preceding optimisation. As a result, the association probabilities and the hyperplanes are optimised alternately until the hyperplanes do not change by more than the predefined threshold, that is an equilibrium is reached.

If it is determined 410 that an equilibrium is reached method 400 proceeds to the step of determining whether a bifurcation takes place at the current temperature. Bifurcation in this context means that the current number of hyperplanes is not sufficient to continue the optimisation of the cost function. The condition for bifurcation is that either the Hessian F* of the optimisation loses its positive definite property or that the second-order derivative with respect to a perturbation coefficient ε is zero:

$$\left. \frac{d^2}{d\delta^2} F^*(A + \delta\Psi) \right|_{\delta=0} = 0 \qquad (12)$$

Where Ψ is a perturbation vector. The deduction of this condition for bifurcation can be found in [1]. It can be shown that bifurcation occurs as the temperature is lowered to a critical temperature that is twice the variance along the principal axis of a cluster defined by radiance spectra that are associated with a particular material. The variance along the principal axis is determined by the largest eigenvalue of the covariance matrix of that cluster.

If bifurcation occurs, a new hyperplane is added 414 to the optimisation problem. In some examples, bifurcation occurs in more than one cluster and as a result, more than one hyperplanes are added 414. In case of isotropic Gaussian random variables, a large number of new hyperplanes may be generated since no preferred direction can be determined. A termination condition as described below prevents such an explosion of hyperplanes.

The next step of method 400 in FIG. 4 is to lower 416 the temperature T. As mentioned earlier, the temperature T determines the weight that is given to the entropy in equation (4). By lowering the temperature T less weight is given to the randomness of the solution and more weight is given to the cost function of equation (2).

In this example, the lowered temperature is 0.6 times the previous temperature. In different examples the temperature schedule is determined by a fixed temperature step, a logarithmic function or an exponential decay with a decay rate of 0.8, that is $T(n)=0.02 \, e^{-0.8n}$, where n is the iteration index. In yet another example, the change of temperature is adaptive and depends on parameters of the optimisation steps.

After lowering the temperature T it is determined 418 whether a termination condition is satisfied. In this example, the termination condition is satisfied if a minimal temperature, such as 0.00025 or a maximal number of hyperplanes, such as 20, is reached. In other examples, the termination condition is a maximal number of iterations, a convergence test of hyperplanes or based on the values of the association probabilities. If the termination condition is not satisfied, the method returns to the step of minimising 406 the cost function with respect to the association probabilities. This way, an optimal solution is found by iteratively maximising the cost function to find the optimal association probabilities and hyperplanes and lowering the temperature.

It is noted that the steps of determining bifurcation 412, lowering the temperature 416 and determining termination conditions 418 need not be in this particular order but may be rearranged.

When the termination condition of step 418 is satisfied the method leaves the iteration process. At this point the method 400 has generated plural basis vectors, that is support vectors for the optimal hyperplanes. The image data can then be represented in terms of these basis vectors and the resulting association probabilities and therefore, a compact representation is available.

Although this compact representation is optimal, in most examples the association probabilities of neighboring pixel locations are correlated and this spatial correlation is used to achieve an even more compact representation. This similarly applies to the temporal correlation found in association probabilities of pixel locations of consecutive frames of video data.

If only the compact representation in terms of the basis spectra is required and not the endmembers, the method 400 terminates here. Otherwise, the method proceeds with determining 418 the illumination spectrum by intersecting the hyperplanes.

As it is apparent from FIG. 7 and the dichromatic reflection model of equation (1), all hyperplanes 710 and 720 share the illumination spectrum vector L 750. Therefore, the illumination spectrum is determined by intersecting the hyperplanes. In most examples more than two hyperplanes are present and therefore the problem of finding the intersection of the hyperplanes is overdetermined. A least-squares intersection method according to [3], which is incorporated herein by reference, is employed.

If more than one illumination source is present in the captured image data, the steps described above are embedded into an additional loop (not shown in FIG. 4) that also employs the deterministic annealing process to find an optimal set of illumination spectra. The most important steps are determining or accessing plural illumination spectra; and determining for each pixel location, a measure of contribution of each illumination spectrum, wherein the illumination spectra or measure of contribution maximise the independence of the image data along the illumination spectra.

Once the illumination spectrum is determined, the pixel reflectance R for wavelength $\lambda_t$ is given by $$R(u, \lambda) = \frac{I(u, \lambda)}{L(\lambda)}.$$

The pixel reflectance values for one pixel and all wavelengths, that is the pixel reflectance spectrum, are written in vector notation as $R(u)=[R(u,\lambda_1), \ldots, R(u,\lambda_K)]^T$. The distance between this pixel reflectance spectrum and a material reflectance spectrum is defined based on their Euclidean angle:

$$d(u, M) = 1 - \frac{\tilde{R}(u)^T S(M)}{|S(M)|} \quad (13)$$

where $\tilde{R}(u)$ has been obtained by normalizing $R(u)$ to unit $L^2$-norm.

The material reflectance, that is the endmembers, S(M) are then determined by minimising the cost function $$C_{Reflectance} = \sum_{u \in I} \sum_{M \in M} p(M \mid u)\left(1 - \frac{\tilde{R}(u)^T S(M)}{|S(M)|}\right) - L \quad (14)$$

In order to minimise the cost function (14) with respect to the endmembers, the derivative with respect to the endmembers is computed:

$$\frac{\partial C_{Reflectance}}{\partial S(M)} = -\sum_{u \in I} p(M \mid u) \frac{\|S(M)\|^2 \tilde{R}(u) - (\tilde{R}(u)^T S(M))S(M)}{\|S(M)\|^3} \quad (15)$$

Setting the derivative to zero, we obtain $$S(M) \propto \sum_{u \in I} p(M \mid u)\tilde{R}(u) \quad (16)$$

Using the association probabilities from the previous optimisation steps, the endmembers are determined. The endmembers or the basis vectors can be used to achieve a compact representation of the image data.

In one example, the image data comprises radiance data for 2048*1536=3,145,728 pixel locations, that is 3.1 megapixels and 56 wavelengths, that is 56 bands. In that case, the image data comprises 3,145,728*56=176,160,768 values. If there are 10 different materials present in the scene, the result of the method is 10 hyperplanes, that is 20 basis vectors, and 10 contributions, that is association probabilities, per pixel. As a result, only 3,145,728*10+20=31,457,300 values need to be stored which is a significant reduction in memory space.

In another example, the number of hyperplanes is at least the number of bands. It is noted that the hyperplanes need to be stored only once and not per pixel. Only the contribution probabilities are stored per pixel. As a result, even with more hyperplanes than bands, the number of values stored is reduced. In order to reconstruct the image spectrum at each pixel location, well known methods are applied to determine the point in the sample space that is defined by the hyperplanes and the contributions of that pixel location.

In a different example, the endmembers are stored together with the basis vectors and the contributions. In that case, for reconstructing the image spectrum, the illumination spectrum is determined from the hyperplane as described above and the image spectrum is recovered by $$I(u) \propto \sum_M p(M \mid u) Q(M)(S(M) \square L) \quad (17)$$

with $Q(M)=A(M)(A(M)^T A(M))^{-1} A(M)^T$ and $A(M)=[z_1(M), z_2(M)]$ and where the $\square$ symbol denotes element-wise multiplication.

As it is apparent from Equation (17), the image spectrum is reconstructed up to a scaling factor, that is the image spectrum is proportional to the right hand side of the equation. In one example, the step of storing the decomposed image data comprises determining for each pixel location a proportionality factor by dividing the captured image spectrum by the sum on the right hand side of equation (17) and storing the proportionality factors together with the hyperplanes, the endmembers and the contributions.

In a different example, the contributions are adjusted to also incorporate the proportionality factor. As a result, the contributions are not probabilities anymore since the sum of all contributions is not one after the contributions are adjusted. In this example, there is no additional memory space required to store the proportionality factors since they are included in the contributions.

In another example, the radiance spectra of the materials are considered as the endmembers instead of the reflectance spectra. Since the radiance and the reflectance are connected by the illumination spectrum according to Equation (1), there is no conceptual difference between the two representations.

The endmembers of an image can be used in pre and post processing of the image data.

Processing of the image includes, but is not limited to:
Image editing
  re-illumination, such as colour manipulation to change an image from warm to cold, or change illumination spectrum of an image to change the illumination from daylight to sunlight, or sunlight to tungsten
  re-shading
  re-colouring, for example to change a black and white image to colour based on the properties of a known colour set or colouring the image such that materials for each of the identified hyperplanes are represented by distinctive colours
  material modification
  highlight removal
  surface rendering
  material modification
Material recognition or classification
  material, pattern or object recognition and classification
Hardware Calibration
  improve photometric calibration, such as that of sensor 800 that captured the image Although in FIG. 3 the data from sensor 302 is processed by computer 304, other embodiments are also possible. For example, the sensor 302, the processor 310 and the memory 308 may be integrated within a camera. In this example, the monitor 312 may be arranged at the back of that integrated camera. Alternatively, the integrated camera may be connected to the Internet and the basis vectors, the compact representation or the endmembers may be transmitted from a remote camera location to a user via the Internet.

The endmembers may be presented to the user in the form of abundances. An abundance is a single image for a single material such that the intensity or colour of each pixel location reflects the association probability, that is the measure of contribution of that material to that pixel value.

The method for estimating the basis spectra or endmembers may be directly implemented in hardware, such as an application specific integrated circuit or a field programmable gate array. This hardware may even be integrated with the sensor 302 into a single integrated circuit.

Applications of the methods described here include to the fields of:
  digital photography, such as image editing
  manufacturing, such as quality and production control.
  product analysis, such as determining whether a vehicle had been in an accident, and
  surveillance, such as face identification and tracking.

The multispectral image can be converted to a colour band representation, such as RGB (Red, Green, Blue), and in that sense the methods described here can be used to generate colour images.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

REFERENCES

[1] K. Rose. Deterministic Annealing for Clustering, Compression, Classification, Regression, and Related Optimization Problems. in Proceedings of the IEEE, 1998, 86(11), pages 2210-2239.
[2] S. A. Shafer. Using color to separate reflection components. Color Research & Application, 1985, 10(4), pages 210-218.
[3] G. D. Finlayson, G. Schaefer. Convex and non-convex illuminant constraints for dichromatic colour constancy. Proceedings of the IEEE Computer Society Conference on Computer Vision and Pattern Recognition, vol. 1, 2001, pages 598-604.

The invention claimed is:

1. A computer implemented method for decomposing hyperspectral or multispectral image data, the image data comprising for each pixel location a sampled image spectrum that is a mixture of plural reflectance spectra, the method comprising:
  accessing a data source for plural linearly independent basis vectors, characterizing plural hyperplanes, each hyperplane representing an estimate of one of the plural reflectance spectra; and
  determining for each pixel location, a contribution of the plural basis vectors of each hyperplane to the image spectrum of that pixel location.

2. The method of claim 1, wherein the step of determining the contribution comprises determining an association probability that optimizes a first cost function based on affinities of the image spectrum to the set of hyperplanes.

3. The method of claim 2, wherein the method further comprises the steps of determining the plural linearly independent basis vectors by optimizing a second cost function based on the association probabilities; and storing the plural optimized linearly independent basis vectors in the data store.

4. The method of claim 3, wherein the steps of the method are repeated and the step of accessing plural linearly independent basis vectors comprises retrieving the plural linearly independent basis vectors optimized by the second cost function from the preceding repetition.

5. The method of claim 2, wherein the first cost function is based on a measure of entropy.

6. The method of claim 5, wherein the measure of entropy is weighted by a temperature.

7. The method of claim 6, wherein the method comprises the step of lowering the temperature of a previous repetition to a lower temperature for a following repetition.

8. The method of claim 7, wherein the step of lowering the temperature comprises lowering the temperature according to one of:
   a predetermined factor,
   an exponential decay,
   a fixed temperature step,
   an adaptive schedule, and
   a logarithmic function.

9. The method of claim 6, wherein the method comprises:
   determining whether a bifurcation occurs at or near the temperature; and
   upon determining that a bifurcation occurs, adding two or more additional linearly independent basis vectors to the linearly independent basis vectors.

10. The method of claim 7, wherein the method is repeated until a predetermined termination condition is satisfied, the predetermined termination condition being based on one of:
    a minimum temperature, and
    a maximum number of hyperplanes.

11. The method of claim 1, wherein accessing the plural linearly independent basis vectors comprises retrieving the linearly independent basis vectors stored in a spectral library.

12. The method of claim 1, wherein the method comprises the step of determining an intersection of the hyperplanes to determine an illumination spectrum.

13. The method of claim 12, wherein the method comprises the step of determining endmembers of materials present in the scene based on the image data, the illumination spectrum and the contributions.

14. The method of claim 1, wherein the method further comprises the step of storing on a computer readable medium a compact representation comprising the plural linearly independent basis vectors, and for each pixel location the contribution of the basis vectors for that pixel location.

15. A non-transitory computer readable medium with an executable program stored therein that when executed by a computer causes the computer to perform the method of claim 1.

16. The method of claim 1 wherein before accessing the plural linearly independent basis vectors, the method further comprises:
    determining the linearly independent basis vectors based on clustering or randomly; and
    storing the linearly independent basis vectors in the data store.

17. A computer system for decomposing hyperspectral or multispectral image data, the image data comprising for each pixel location a sampled image spectrum that is a mixture of plural reflectance spectra, the system comprising:
    a processor to access from a data store plural linearly independent basis vectors, characterizing plural hyperplanes such that each hyperplane represents an estimate of one of the plural reflectance spectra; and determine for each pixel location, a contribution of the plural basis vectors of each hyperplane to the image spectrum of that pixel location.

18. The computer system of claim 17, wherein the computer system comprises a port to receive the image data and a storage means to store for each pixel location the contribution of the basis vectors of each hyperplane for that pixel location.

19. A computer implemented method for determining reflectance spectra from a compact representation of image data, the method comprising:
    accessing from a data store the compact representation comprising plural linearly independent basis vectors characterizing plural hyperplanes and for each pixel location a measure of contribution of the basis vectors;
    determining one or more intersections of the hyperplanes;
    determining an illumination spectrum based on the one or more intersections; and
    determining for each hyperplane, based on the illumination spectrum, a reflectance spectrum represented by that hyperplane.

20. The method according to claim 19, wherein the method further comprises determining a compact representation comprising decomposing hyperspectral or multispectral image data and storing the compact representation on a computer readable medium.

21. A non-transitory computer readable medium with an executable program stored therein that when executed by a computer cause the computer to perform the method of claim 20.

22. A non-transitory computer readable medium with an executable program stored therein that when executed by a computer cause the computer to perform the method of claim 19.

23. A computer system for determining reflectance spectra from a compact representation of image data, the computer system comprising:
    a processor to access from a data store the compact representation comprising plural linearly independent basis vectors characterizing plural hyperplanes and for each pixel location a measure of contribution of the basis vectors, to determine one or more intersections of the hyperplanes, to determine an illumination spectrum based on the one or more intersections, and to determine for each hyperplane, based on the illumination spectrum, a reflectance spectrum of that hyperplane.

* * * * *

UNITED STATES PATENT AND TRADEMARK OFFICE
CERTIFICATE OF CORRECTION

PATENT NO. : 8,670,620 B2
APPLICATION NO. : 13/207016
DATED : March 11, 2014
INVENTOR(S) : Antonio Robles-Kelly et al.

It is certified that error appears in the above-identified patent and that said Letters Patent is hereby corrected as shown below:

In the Specification:

Column 9, Line 38, Equation 3:

" $$C_{Entropy} = C_{Total} - L \qquad (3)$$ "

Should read:

-- $$C_{Entropy} = C_{Total} - \mathcal{L} \qquad (3)$$ --

Column 9, Line 41, Equation 4:

" $$L = TH(\mathrm{P}) + \sum_{u \in I} \alpha(u)\left(\sum_{M \in \mathrm{M}} p(M|u) - 1\right) \qquad (4)$$ "

Should read:

-- $$\mathcal{L} = TH(\mathcal{P}) + \sum_{u \in \mathcal{I}} \alpha(u)\left(\sum_{M \in \mathcal{M}} p(M|u) - 1\right) \qquad (4)$$ --

Column 11, Line 13, Equation 9:

" $$C_{Light} = \sum_{u \in I} \sum_{M \in \mathrm{M}} p(M|u) \|\mathbf{I}(u) - Q(M)\mathbf{I}(u)\|^2 - L \qquad (9)$$ "

Should read:

-- $$C_{Light} = \sum_{u \in \mathcal{I}} \sum_{M \in \mathcal{M}} p(M|u) \|\mathbf{I}(u) - Q(M)\mathbf{I}(u)\|^2 - \mathcal{L} \qquad (9)$$ --

Signed and Sealed this
Twelfth Day of August, 2014

Michelle K. Lee
*Deputy Director of the United States Patent and Trademark Office*

Column 11, Line 38, Equation 10:

"$$\sum_{u \in I} p(M|u) \|\mathbf{I}(u) - Q(M)\mathbf{I}(u)\|^2 = \sum_{u \in I} \left\| \sqrt{p(M|u)} \mathbf{I}(u) - A(M) b(u,M) \right\|^2 \qquad (10)$$"

Should read:

$$\sum_{u \in \mathcal{I}} p(M|u) \|\mathbf{I}(u) - Q(M)\mathbf{I}(u)\|^2 = \sum_{u \in \mathcal{I}} \left\| \sqrt{p(M|u)} \mathbf{I}(u) - A(M) b(u,M) \right\|^2 \qquad (10)$$

Column 11, Line 45:

"$b(u,M) \square \sqrt{p(M|u)} \left( A(M)^T A(M) \right)^{-1} A(M)^T \mathbf{I}(u)$"

Should read:

$b(u,M) \triangleq \sqrt{p(M|u)} \left( A(M)^T A(M) \right)^{-1} A(M)^T \mathbf{I}(u)$ Column 13, Line 61, Equation 13:

"$$d(u,M) = 1 - \frac{\tilde{\mathbf{R}}(u)^T \mathbf{S}(M)}{\|\mathbf{S}(M)\|} \qquad (13)$$"

Should read:

$$d(u,M) = 1 - \frac{\tilde{\mathbf{R}}(u)^T \mathbf{S}(M)}{\|\mathbf{S}(M)\|} \qquad (13)$$

Column 14, Line 5, Equation 14:

"$$C_{Reflectance} = \sum_{u \in I} \sum_{M \in M} p(M|u) \left( 1 - \frac{\tilde{\mathbf{R}}(u)^T \mathbf{S}(M)}{\|\mathbf{S}(M)\|} \right) - L \qquad (14)$$"

Should read:

$$C_{Reflectance} = \sum_{u \in \mathcal{I}} \sum_{M \in \mathcal{M}} p(M|u) \left( 1 - \frac{\tilde{\mathbf{R}}(u)^T \mathbf{S}(M)}{\|\mathbf{S}(M)\|} \right) - \mathcal{L} \qquad (14)$$

CERTIFICATE OF CORRECTION (continued)
U.S. Pat. No. 8,670,620 B2

Page 3 of 3

Column 14, Line 15, Equation 15:

"
$$\frac{\partial C_{Reflectance}}{\partial S(M)} = -\sum_{u\in I} p(M \mid u) \frac{\|S(M)\|^2 \bar{R}(u) - (\bar{R}(u)^T S(M)) S(M)}{\|S(M)\|^3} \quad (15)$$
"

Should read:

$$\frac{\partial C_{Reflectance}}{\partial S(M)} = -\sum_{u\in I} p(M \mid u) \frac{\|S(M)\|^2 \widetilde{R}(u) - (\widetilde{R}(u)^T S(M)) S(M)}{\|S(M)\|^3} \quad (15)$$

Column 14, Line 23, Equation 16:

"
$$S(M) \propto \sum_{u\in I} p(M \mid u) \bar{R}(u) \quad (16)$$
"

Should read:

$$S(M) \propto \sum_{u\in I} p(M \mid u) \widetilde{R}(u) \quad (16)$$

Column 14, Line 56, Equation 17:

"
$$I(u) \propto \sum_{M} p(M \mid u) Q(M)(S(M) \square L) \quad (17)$$
"

Should read:

$$I(u) \propto \sum_{M} p(M \mid u) Q(M)(S(M) \odot L) \quad (17)$$

Column 14, Line 60:

"the □ symbol"

Should read:

--- the ⊙ symbol ---